US008324872B2

(12) United States Patent
Sutardja

(10) Patent No.: US 8,324,872 B2
(45) Date of Patent: Dec. 4, 2012

(54) VOLTAGE REGULATOR WITH COUPLED INDUCTORS HAVING HIGH COEFFICIENT OF COUPLING

(75) Inventor: Sehat Sutardja, Los Altos Hills, CA (US)

(73) Assignee: Marvell World Trade, Ltd., St. Michael (BB)

( * ) Notice: Subject to any disclaimer, the term of this patent is extended or adjusted under 35 U.S.C. 154(b) by 1331 days.

(21) Appl. No.: 10/810,452

(22) Filed: Mar. 26, 2004

(65) Prior Publication Data

US 2005/0212496 A1    Sep. 29, 2005

(51) Int. Cl.
G05F 1/10 (2006.01)
G05F 1/652 (2006.01)
G05F 1/613 (2006.01)

(52) U.S. Cl. ......... 323/222; 323/284; 323/224; 323/225

(58) Field of Classification Search .................. 323/222, 323/284, 224, 225
See application file for complete search history.

(56) References Cited

U.S. PATENT DOCUMENTS

| | | |
|---|---|---|
| 3,146,300 A | 8/1964 | Beckius et al. |
| 3,305,697 A | 2/1967 | Neusbaum |
| 3,529,233 A | 9/1970 | Podell |
| 3,579,214 A | 5/1971 | Solyst |
| 3,599,325 A | 8/1971 | Burr et al. |
| 3,766,308 A | 10/1973 | Loro |
| 3,851,375 A | 12/1974 | Koorneef |
| 4,020,439 A | 4/1977 | Thiessens et al. |
| 4,031,496 A | 6/1977 | Fujiwara et al. |
| 4,040,174 A | 8/1977 | Tsuda |
| 4,047,138 A | 9/1977 | Steigerwald |
| 4,116,519 A | 9/1978 | Grabbe et al. |
| 4,203,081 A | 5/1980 | Braeckelmann |
| 4,214,198 A * | 7/1980 | Schneider ..................... 320/126 |
| 4,245,286 A | 1/1981 | Paulkovich et al. |
| 4,273,051 A * | 6/1981 | Stratton |
| 4,313,152 A | 1/1982 | Vranken |
| 4,371,912 A | 2/1983 | Guzik |
| 4,384,321 A | 5/1983 | Rippel et al. |
| 4,408,268 A | 10/1983 | Peters et al. |

(Continued)

FOREIGN PATENT DOCUMENTS

CN    1292636 A    4/2001

(Continued)

OTHER PUBLICATIONS

Hayt and Kemmerly, "Engineering Circuit Analysis", 1986, Mcgraw-Hill Book Company, Fourth Edition, pp. 442-443.*

(Continued)

*Primary Examiner* — Bao Q Vu

(57) ABSTRACT

A voltage regulator including at least one coupled inductor including a first winding and a second winding each having a polarity. The first winding and the second winding connected in series to form a common node such that the first winding and the second winding have the same polarity. The first winding and the second winding having a coefficient of coupling approximately equal to one. A conduction switch having an on-state and an off-state, to controllably conduct an input voltage to the at least one coupled inductor at a switching frequency. A freewheeling switch having an on-state and an off-state, in communication with the common node of the at least one coupled inductor to provide a path for current when the conduction switch is in the off-state. An output capacitor in communication with the at least one coupled inductor to filter the output voltage.

25 Claims, 3 Drawing Sheets

U.S. PATENT DOCUMENTS

| | | |
|---|---|---|
| 4,475,143 A | 10/1984 | Hernandez |
| 4,527,032 A | 7/1985 | Young et al. |
| 4,536,733 A | 8/1985 | Shelly et al. |
| 4,578,664 A | 3/1986 | Kinzler et al. |
| 4,583,068 A | 4/1986 | Dickens et al. |
| 4,616,142 A | 10/1986 | Upadhyay et al. |
| 4,616,205 A | 10/1986 | Praught et al. |
| 4,630,170 A | 12/1986 | Kask et al. |
| 4,638,279 A | 1/1987 | Brisson et al. |
| 4,641,112 A | 2/1987 | Kohayakawa |
| 4,675,629 A | 6/1987 | Sakamoto et al. |
| 4,728,810 A | 3/1988 | Engel |
| 4,801,912 A | 1/1989 | McElheny et al. |
| 4,803,609 A | 2/1989 | Gillett et al. |
| 4,897,773 A | 1/1990 | Bilczo |
| 5,006,782 A | 4/1991 | Pelly |
| 5,057,805 A | 10/1991 | Kadowaki |
| 5,079,498 A | 1/1992 | Cleasby et al. |
| 5,175,525 A | 12/1992 | Smith |
| 5,186,647 A | 2/1993 | Denkmann et al. |
| 5,204,809 A | 4/1993 | Andresen |
| 5,225,971 A | 7/1993 | Spreen |
| 5,303,115 A | 4/1994 | Nayar et al. |
| 5,359,313 A | 10/1994 | Watanabe et al. |
| 5,362,257 A | 11/1994 | Neal et al. |
| 5,363,035 A | 11/1994 | Hutchison et al. |
| 5,399,106 A | 3/1995 | Ferry |
| 5,400,006 A | 3/1995 | Cardozo |
| 5,402,329 A | 3/1995 | Wittenbreder, Jr. |
| 5,403,196 A | 4/1995 | Northey et al. |
| 5,403,208 A | 4/1995 | Felcman et al. |
| 5,410,180 A | 4/1995 | Fujii et al. |
| 5,442,317 A | 8/1995 | Stengel et al. |
| 5,444,600 A | 8/1995 | Dobkin et al. |
| 5,461,255 A | 10/1995 | Chan et al. |
| 5,475,296 A | 12/1995 | Vinsant et al. |
| 5,481,238 A | 1/1996 | Carsten et al. |
| 5,500,629 A | 3/1996 | Meyer |
| 5,509,691 A | 4/1996 | Kaule et al. |
| 5,526,565 A | 6/1996 | Roberts |
| 5,554,050 A | 9/1996 | Marpoe, Jr. |
| 5,586,914 A | 12/1996 | Foster et al. |
| 5,611,700 A | 3/1997 | Mitra |
| 5,636,107 A * | 6/1997 | Lu et al. .................. 363/20 |
| 5,650,357 A | 7/1997 | Dobkin et al. |
| 5,654,881 A | 8/1997 | Albrecht et al. |
| 5,684,445 A | 11/1997 | Kobayashi et al. |
| 5,764,500 A | 6/1998 | Matos |
| 5,781,093 A | 7/1998 | Grandmont et al. |
| 5,802,709 A | 9/1998 | Hogge et al. |
| 5,808,537 A | 9/1998 | Kondo et al. |
| 5,821,832 A | 10/1998 | Moreau |
| 5,834,591 A | 11/1998 | Normark et al. |
| 5,875,103 A | 2/1999 | Bhagwat et al. |
| 5,889,373 A | 3/1999 | Fisher et al. |
| 5,909,037 A | 6/1999 | Rajkomar et al. |
| 5,926,358 A | 7/1999 | Dobkin et al. |
| 5,959,441 A | 9/1999 | Brown |
| 5,999,417 A | 12/1999 | Schlecht |
| 6,018,468 A | 1/2000 | Archer et al. |
| 6,023,154 A | 2/2000 | Martinez |
| 6,043,634 A | 3/2000 | Nguyen |
| 6,046,662 A | 4/2000 | Schroter et al. |
| 6,049,264 A | 4/2000 | Sailer et al. |
| 6,054,764 A | 4/2000 | Howser et al. |
| 6,057,665 A * | 5/2000 | Herniter et al. .............. 320/101 |
| 6,084,790 A | 7/2000 | Wong |
| 6,087,715 A | 7/2000 | Sawada et al. |
| 6,114,932 A | 9/2000 | Wester et al. |
| 6,137,389 A | 10/2000 | Uchikoba |
| 6,144,269 A | 11/2000 | Okamoto et al. |
| 6,150,798 A | 11/2000 | Ferry et al. |
| 6,166,527 A * | 12/2000 | Dwelley et al. .............. 323/222 |
| 6,184,579 B1 | 2/2001 | Sasov |
| 6,184,666 B1 * | 2/2001 | Boeckmann et al. ......... 323/282 |
| 6,191,673 B1 | 2/2001 | Ogura et al. |
| 6,201,186 B1 | 3/2001 | Daniels et al. |
| 6,225,727 B1 | 5/2001 | Oohashi et al. |
| 6,229,289 B1 | 5/2001 | Piovaccari et al. |
| 6,246,592 B1 | 6/2001 | Balogh et al. |
| 6,255,804 B1 * | 7/2001 | Herniter et al. .............. 320/137 |
| 6,259,235 B1 * | 7/2001 | Fraidlin et al. .............. 323/222 |
| 6,282,103 B1 | 8/2001 | Naito et al. |
| 6,287,164 B1 | 9/2001 | Radloff |
| 6,310,534 B1 | 10/2001 | Brunner |
| 6,329,801 B1 | 12/2001 | Zuniga et al. |
| 6,348,744 B1 | 2/2002 | Levesque |
| 6,356,179 B1 | 3/2002 | Yamada |
| 6,356,462 B1 | 3/2002 | Jang et al. |
| 6,362,986 B1 | 3/2002 | Schultz et al. |
| 6,383,845 B2 | 5/2002 | Masuda et al. |
| RE37,738 E * | 6/2002 | Brkovic ....................... 323/222 |
| 6,404,066 B1 | 6/2002 | Tsuji et al. |
| 6,404,175 B1 * | 6/2002 | Yang et al. ................... 323/282 |
| 6,438,000 B1 | 8/2002 | Okamoto et al. |
| 6,459,349 B1 | 10/2002 | Giday et al. |
| 6,462,962 B1 | 10/2002 | Cuk |
| 6,483,623 B1 | 11/2002 | Maruyama |
| 6,493,242 B1 | 12/2002 | Riggio et al. |
| 6,512,352 B2 * | 1/2003 | Qian ........................... 323/282 |
| 6,512,437 B2 | 1/2003 | Jin et al. |
| 6,522,233 B1 | 2/2003 | Kyoso et al. |
| 6,556,456 B1 | 4/2003 | Takehara |
| 6,583,697 B2 | 6/2003 | Koyama et al. |
| 6,612,890 B1 | 9/2003 | Radloff |
| 6,661,091 B1 | 12/2003 | Bando |
| 6,683,522 B2 | 1/2004 | Walsh |
| 6,686,823 B2 | 2/2004 | Arntz et al. |
| 6,703,815 B2 | 3/2004 | Biagi |
| 6,738,274 B2 | 5/2004 | Prasad et al. |
| 6,798,177 B1 | 9/2004 | Liu et al. |
| 6,820,321 B2 | 11/2004 | Harding |
| 6,822,427 B2 * | 11/2004 | Wittenbreder ................ 323/282 |
| 6,853,169 B2 | 2/2005 | Burstein et al. |
| 6,853,568 B2 | 2/2005 | Li et al. |
| 6,853,588 B2 | 2/2005 | Kim et al. |
| 6,879,237 B1 | 4/2005 | Viarouge et al. |
| 6,967,553 B2 | 11/2005 | Jitaru |
| 6,995,685 B2 | 2/2006 | Randall |
| 7,679,347 B2 | 3/2010 | He et al. |
| 2001/0052837 A1 | 12/2001 | Walsh |
| 2002/0039061 A1 | 4/2002 | Timashov |
| 2002/0109782 A1 | 8/2002 | Ejima et al. |
| 2002/0118000 A1 | 8/2002 | Xu et al. |
| 2002/0136029 A1 | 9/2002 | Ledenev et al. |
| 2002/0140464 A1 | 10/2002 | Yampolsky et al. |
| 2002/0157117 A1 | 10/2002 | Geil et al. |
| 2003/0011371 A1 | 1/2003 | Rosthal et al. |
| 2003/0111985 A1 | 6/2003 | Xi |
| 2003/0227366 A1 | 12/2003 | Lin |
| 2005/0016815 A1 | 1/2005 | Martin et al. |
| 2006/0116623 A1 | 6/2006 | Han et al. |

FOREIGN PATENT DOCUMENTS

| | | |
|---|---|---|
| DE | 3622190 A | 1/1988 |
| DE | 19837639 | 3/2000 |
| EP | 0484074 A | 5/1992 |
| EP | 0503715 | 9/1992 |
| EP | 0 632 571 A | 1/1995 |
| EP | 0895257 A | 2/1999 |
| EP | 0929143 | 7/1999 |
| EP | 1 239 574 A2 | 9/2002 |
| FR | 2620852 | 3/1989 |
| GB | 2318691 A | 4/1998 |
| JP | 57089212 | 6/1982 |
| JP | 57193007 | 11/1982 |
| JP | 57191011 | 12/1982 |
| JP | 58224420 A | 12/1983 |
| JP | 59009526 | 1/1984 |
| JP | 61078111 A | 4/1986 |
| JP | 63006712 | 1/1988 |
| JP | 02125404 A | 5/1990 |
| JP | 02251107 | 10/1990 |
| JP | 04062807 | 2/1992 |
| JP | 5267064 | 10/1993 |
| JP | 6061707 | 3/1994 |
| JP | 06260869 | 9/1994 |

| | | | |
|---|---|---|---|
| JP | 869934 A | 3/1996 |
| JP | 8107021 | 4/1996 |
| JP | 10335146 | 12/1998 |
| JP | 11008123 | 1/1999 |
| JP | 11074125 A | 3/1999 |
| JP | 11 146638 A | 5/1999 |
| JP | 11186045 | 7/1999 |
| JP | 11204354 A | 7/1999 |
| JP | 11233348 | 8/1999 |
| JP | 11273975 | 8/1999 |
| JP | 11354329 | 12/1999 |
| JP | 2002057049 | 2/2002 |
| JP | 20020570039 A | 2/2002 |
| JP | 2002075737 | 3/2002 |
| JP | 2002095166 | 3/2002 |
| JP | 2003124015 | 4/2003 |
| JP | 2003142319 | 5/2003 |
| JP | 2003332141 A | 11/2003 |
| JP | 2003347130 | 12/2003 |
| JP | 2005252783 | 9/2005 |
| JP | 2006095956 | 4/2006 |
| JP | 2008274582 | 11/2008 |
| TW | 403917 | 9/2000 |
| TW | 445467 | 7/2001 |
| WO | WO 00/74089 A1 | 12/2000 |
| WO | WO 01/43276 | 6/2001 |
| WO | WO0217469 | 2/2002 |
| WO | WO0225677 A2 | 3/2002 |
| WO | WO 02/095775 A1 | 11/2002 |

OTHER PUBLICATIONS

U.S. Appl. No. 10/621,128, filed Jul. 16, 2003, entitled, "Power Inductor With Reduced DC Current Saturation", pp. 1-33, and 6 sheets of drawings.
U.S. Appl. No. 10/693,787, filed Oct. 24, 2003, entitled, "Voltage Regulator", pp. 1-104, 11 sheets of drawings.
U.S. Appl. No. 10/744,416, filed Dec. 22, 2003, entitled, "Power Inductor With Reduced DC Current Saturation", pp. 1-39, and 9 sheets of drawings.
U.S. Appl. No. 10/754,187, filed Jan. 8, 2004, entitled, "Digital Low Dropout Regulator", pp. 1-85, and 19 sheets of drawings.
Power Converter Topologies, How to Choose the Right One for Your Design; Dennis L. Feucht;, Innovatia Laboratories; 2002; 4 pages.
"Understanding Ferrite Bead Inductors", http://www.murata.com, pp. 23-25; (Sep. 2005).
"Using Ferrite Beads to Keep RF Out of TV Sets, Telephones, VCR's, Burglar Alarms and Other Electronic Equipment," http://www.antennex.com, pp. 1-4; (Sep. 27, 2005).
European Search Report for Application No. 04020571.8, 3 pages; Apr. 13, 2005.
European Search Report for Application No. 04020568.4, 3 pages; Apr. 13, 2005.
European Search Report for Application No. 04010841; 2 pages; Oct. 1, 2004.
European Search Report for Application No. 04011558.6, 2 pages; Oct. 15, 2004.
Communication from European Patent Office dated Aug. 6, 2007 for Application No. 07 004 458.1-1242; 5 pages.
Communication from the European Patent Office dated Oct. 6, 2006 with the European Search Report for Application No. 04019978.8-1242; 3 pages.
Sanchis-Kilders E. et al; "New very low power, high efficiency, DC/DC power supply for LEO satellite constellation"; Power Electronics Specialists Conferences, 1999 IEEE; pp. 1146-1151.
Wei, Chen et al.; "Dual-loop feedback for fast low dropout regulators"; 32nd Annual IEEE Power Electronics Specialists Conference; 2001; pp. 1265-1269.
Communication and partial European Search Report from the European Patent Office dated Oct. 6, 2006 for Application No. 04019981.2-1242.
Communication and partial European Search Report from the European Patent Office dated Oct. 6, 2006 for Application No. 04019963.0-1242.
Decision from the Japan Patent Office dated Jan. 12, 2010 for Application No. 2004178924; 8 pages.
Decision from the Japan Patent Office dated Nov. 24, 2009 for Application No. 2004254991; 7 pages.
First Office Action from the Taiwan Intellectual Property Office dated Feb. 9, 2010 for Application No. 93127468; 12 pages.
First Office Action from the Taiwan Intellectual Property Office dated May 6, 2010 for Application No. 93108084; 17 pages.
Non-Final Rejection from the Japan Patent Office dated Sep. 8, 2009 for Application No. 2004-178924; 12 pages.
Official Communication from the European Patent Office dated Dec. 22, 2009 for Application No. 04 020 568.Apr. 1231; 6 pages.
Official Communication from the European Patent Office dated Dec. 21, 2009 for Application No. 04 011 558.6; 5 pages.
Official Communication from the European Patent Office dated Dec. 18, 2009 for Application No. 04 010 841.7-1231; 5 pages.
Official Communication from the European Patent Office dated Jan. 10, 2010 for Application No. 04 020 571.8; 5 pages.
Official Communication from the European Patent Office dated May 3, 2010 for Application No. 04 011 558.6; 10 pages.
Organized Translation of Non-Final Rejection from the Japanese Patent Office dated Apr. 14, 2009; 5 pages.

* cited by examiner

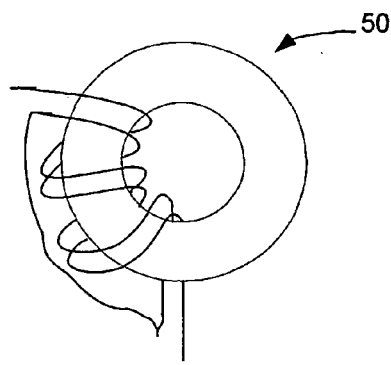
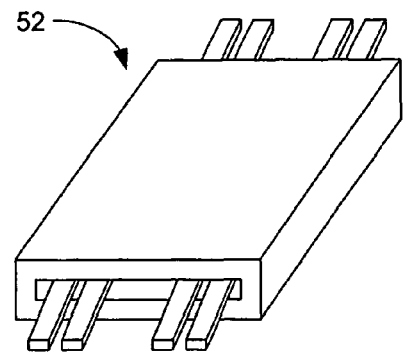
FIG. 3A    FIG. 3B
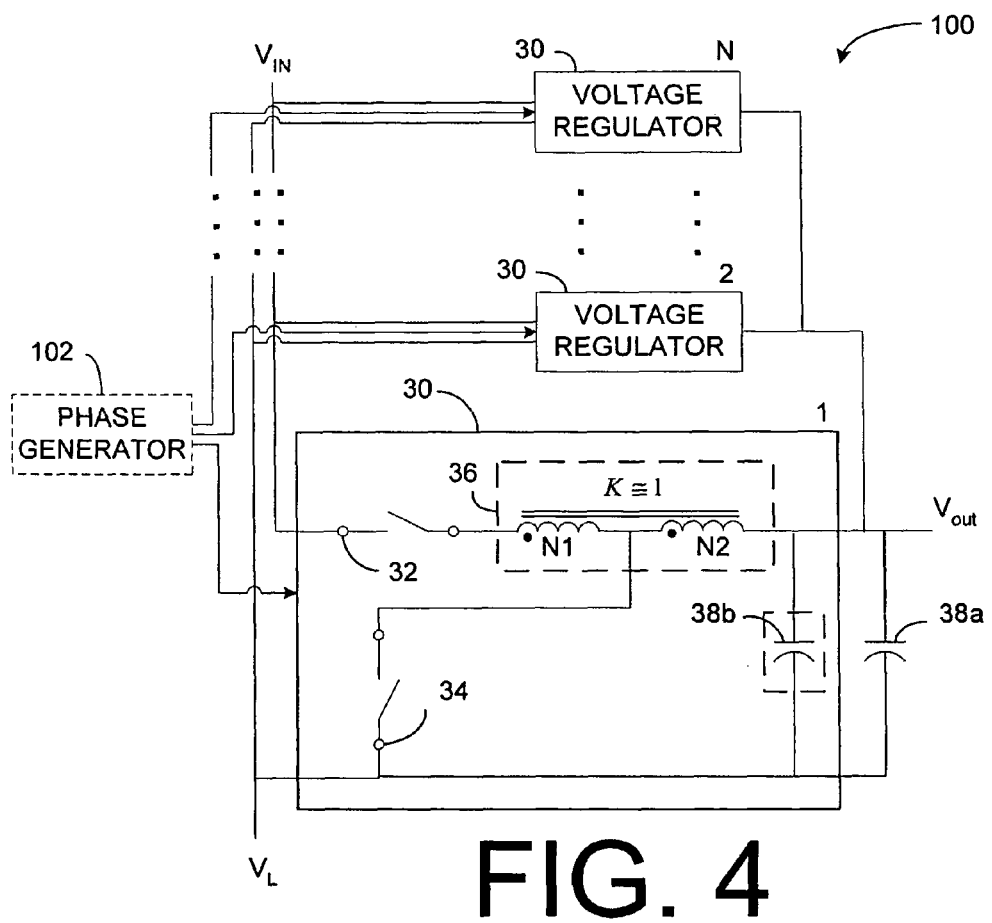
FIG. 4

VOLTAGE REGULATOR WITH COUPLED INDUCTORS HAVING HIGH COEFFICIENT OF COUPLING

CROSS-REFERENCE TO RELATED APPLICATIONS

This application incorporates by reference the entire contents of U.S. non-provisional application Ser. No. 10/754,187, filed Jan. 8, 2004 and Ser. No. 10/693,787, filed Oct. 24, 2003, which claims the benefit of the filing date of U.S. provisional application No. 60/496,957 filed Aug. 21, 2003. This application incorporates by reference the entire contents of U.S. non-provisional application Ser. No. 10/621,128, filed Jul. 16, 2003 and Ser. No. 10/744,416, filed Dec. 22, 2003.

TECHNICAL FIELD

An aspect of this invention relates to power systems for electronic circuits.

BACKGROUND

Switching regulators are widely used to provide voltage regulation in electronics sub-systems. A switching regulator may generate an output voltage by generating a pulse output from an input voltage. The pulse output is generally filtered by a low pass filter to generate a DC output voltage. The amplitude of the DC output voltage may be regulated by varying the pulse width of the pulses that comprise the pulse output or controlling the on-time or the off-time of the pulse output. A significant portion of the power losses in a switching regulator occur in the power switches that generate the pulse output from the input voltage. The power switch losses may be divided between conduction losses and switching losses. As the pulse width decreases in proportion to the switching frequency of the pulse output, the switching losses may increase relative to the conduction losses. In addition, at narrower pulse widths such as a 10% duty cycle, maintaining regulation of the output voltage may become more difficult resulting in increased error in the output voltage.

FIG. 1A shows an exemplary conventional voltage regulator 10 for converting an input voltage of 12 volts to an output voltage, Vout, of approximately 1.2 volts. A conduction switch 12 and freewheeling switch 14 may convert the input to a pulse output. The conduction switch 12 and freewheeling switch 14 are generally selected to be high voltage devices to withstand the entire input voltage. The pulse output may be filtered by an output inductor 16 and output capacitor 18 to form Vout. FIG. 1B shows waveforms associated with the conventional voltage regulator 10. Waveform 20 shows the operating state of the conduction switch 12. Waveform 22 shows the voltage, V1, across the freewheeling switch 14. Voltage V1 may typically have a rise time and a fall time of about 10 nsec. The rise time and fall time are typically limited by the type of switches used for the conduction switch 12 and the freewheeling switch 14. The switching losses may increase as the rise time and fall time increase. Waveform 24 shows the current, I1, flowing through the output inductor 16. As the pulse width continues to decrease, switching losses become a greater proportion of the total power losses.

SUMMARY

A voltage regulator including at least one coupled inductor including a first winding and a second winding each having a polarity. The first winding and the second winding connected in series to form a common node such that the first winding and the second winding have the same polarity. The first winding and the second winding having a coefficient of coupling approximately equal to one. A conduction switch having an on-state and an off-state, to controllably conduct an input voltage to the at least one coupled inductor at a switching frequency. A freewheeling switch having an on-state and an off-state, in communication with the common node of the at least one coupled inductor to provide a path for current when the conduction switch is in the off-state. An output capacitor in communication with the at least one coupled inductor to filter the output voltage.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3A is a graphical representation of an aspect of a coupled inductor.

FIG. 3B is a graphical representation of an aspect of a coupled inductor.

FIG. 4 is a circuit diagram of an aspect of a voltage regulator having multiple output phases.

Like reference symbols in the various drawings indicate like elements.

DETAILED DESCRIPTION

Figure 1A:
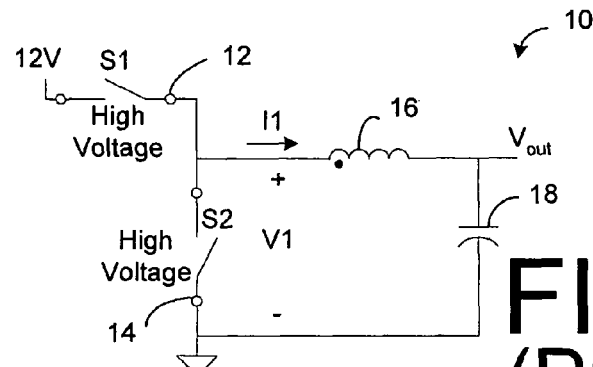
FIG. 1A is a schematic diagram of a standard topology buck regulator.
Figure 1B:
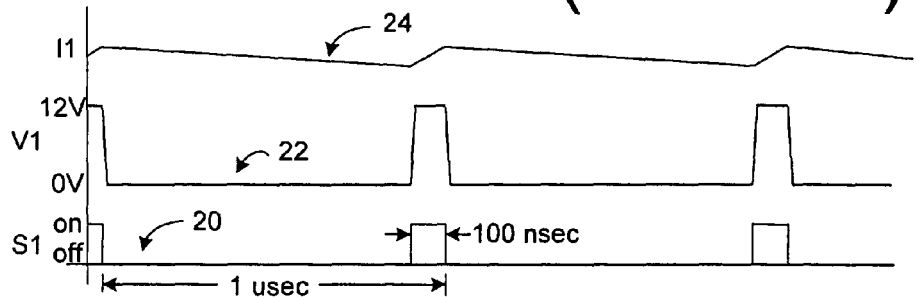
FIG. 1B is a a representation of waveforms associated with an aspect of standard topology buck regulator.
Figure 2A:
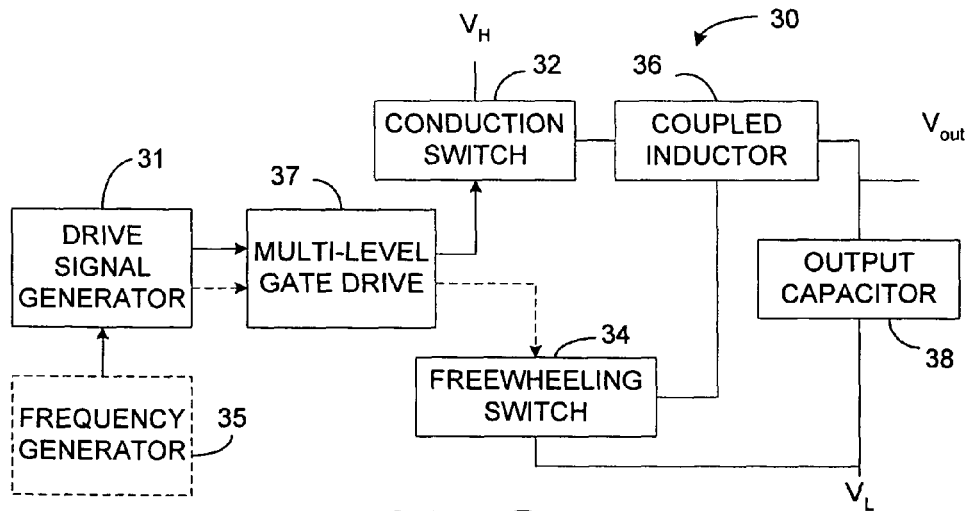
FIG. 2A is a block diagram of an aspect of a voltage regulator.

FIG. 2A shows a block diagram of an aspect of a voltage regulator 30 for supplying power to one or more devices such as high-speed drivers and other electronic devices. The voltage regulator 30 may operate open-loop or closed-loop to convert an input voltage, $V_{IN}$, to a non-isolated output voltage, $V_{OUT}$. The input voltage may be referenced to any voltage such as ground or $V_L$. A conduction switch 32 may switch between in an on-state and an off-state at a switching frequency to apply the input voltage to a coupled inductor 36. The conduction switch 32 may be any type of bi-directional switching device such as Field Effect Transistors (FETs), NMOS, PMOS, Bipolar Junction Transistors (BJTs), and Integrated Gate Bipolar Junction Transistors (IGBTs). During the off-time, the entire input voltage may be impressed across the conduction switch 32, therefore the conduction switch 32 should have a withstanding voltage that is greater than the input voltage. A freewheeling switch 34 may provide a path for current flowing in the coupled inductor 36 when the conduction switch 32 is in the off-state. The freewheeling switch 34 may be any type of switch such as uni-directional switches, bi-directional switches, diodes, rectifiers, synchronous rectifiers, FETs, NMOS, PMOS, BJTs, and IGBTs. Due to the operation of the coupled inductor 36, less than the entire input voltage is impressed across the freewheeling switch 34 during operation of the voltage regulator 30, therefore the freewheeling switch 34 may have a withstanding voltage that is less than the input voltage. Advantageously, switches that have a lower withstanding voltage almost universally have a lower Rds(on) or Vce(sat) than a switch with a comparable die size and a higher withstanding voltage. The lower Rds(on) or Vce(sat) of the freewheeling switch 34 may result in lower conduction losses in the freewheeling switch 34. In addition, the switching losses may also be lower due to the lower voltage impressed across the freewheeling switch 34. The current flowing through the coupled inductor 36 may be filtered by an output capacitor 38 to form Vout. A drive signal generator 31 may generate a drive signal to control the conduction switch 32. The drive signal generator 31 may also generate a drive signal to control the freewheeling switch 34 if a controllable switch such as a FET is used as the freewheeling switch 34.

A frequency generator 35 may generate a clock signal having an operating frequency. The drive signals may be synchronized to operate at the operating frequency. In one aspect, the operating frequency may be fixed to a predetermined frequency. In another aspect, the operating frequency may be controlled in response to changes in load conditions such as output current and output voltage. For example, when a change in the output current, such as an increase in load current, is sensed, the operating frequency may be increased to increase the transient response of the output. Once the voltage regulator 30 has responded to the change in load condition and has reached steady-state operating conditions again, the operating frequency may be decreased to reduce power losses in the voltage regulator 30.

A multi-level gate drive 37 may drive either of the conduction switch 32 and the freewheeling switch 34 using a multi-level gate voltage to reduce switching losses. For example, the amplitude of the on voltage may be adjusted to differing predetermined levels dependent on factors such as the current flowing through the conduction switch 32 to decrease switching losses in the conduction switch 32. Using a two level gate voltage for the conduction switch 32 or freewheeling switch 34 may be advantageous since the output voltage of the voltage regulator 30 may be used as the intermediate level voltage for driving the switches.

Figure 2B:
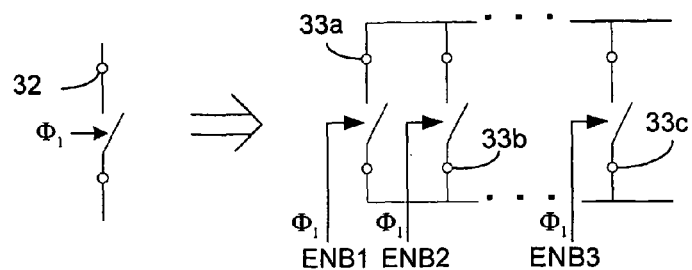
FIG. 2B is a circuit diagram of an aspect of conduction and freewheeling switches in a voltage regulator.

FIG. 2B shows an aspect of the conduction switch 32 and the freewheeling switch 34. Each of the conduction switch 32 and the freewheeling switch 34 may be comprised of one or more parallel switches, 33a-33c, that are independently controllable. Each of the parallel switches 33a-3c may be controlled by enable signals, ENB1-ENB3, to enable either all or a subset of the parallel switches 33a-33c. The enabled parallel switches 33a-33c may then be controlled by the same drive signal, $\Phi_1$.

Figure 2C:
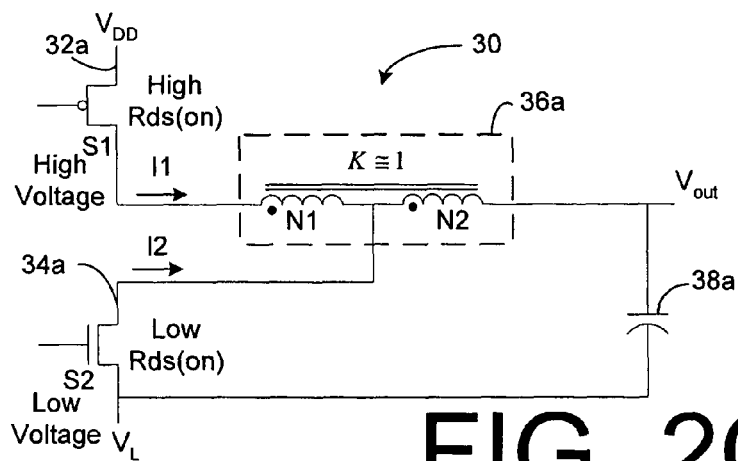
FIG. 2C is a circuit diagram of an aspect of a voltage regulator.

FIG. 2C shows a schematic diagram of an aspect of the voltage regulator 30. In this aspect, PMOS and NMOS devices may be used respectively as a conduction switch 32a and a freewheeling switch 34a. A coupled inductor 36a and an output capacitor 38a may filter the pulse output generated by the conduction switch 32a and the freewheeling switch 34a to generate the DC output voltage, Vout.

The coupled inductor 36a may have a first winding of N1 turns and a second winding of N2 turns. A turns ratio of N1/N2 may be set to a predetermined value to control the flow of energy through the coupled inductor 36a. For example, with a turns ratio of 0, a standard topology buck converter is formed. With a turns ratio of 2, the duty cycle of the voltage regulator is approximately two times greater than the duty cycle for the standard topology buck converter, the current flowing through the coupled inductor 36a is approximately one-half the amplitude, and the voltage impressed across the drain-source of the freewheeling switch 34a is less than the voltage impressed across the drain-source of the standard topology buck converter. The voltage impressed across the drain-source of the freewheeling switch 34a is approximately, $$Vds \cong (Vin - Vout) * \left(\frac{N2}{N1+N2}\right) + Vout.$$

In contradistinction, in a standard topology buck converter the voltage impressed across the drain-source of the freewheeling switch is approximately, $Vds \cong Vin$.

Therefore, the freewheeling switch 34a may be selected to have a lower withstanding voltage, Vds; and by using a similar die size to what a standard topology switch would use, the Rds(on) for the freewheeling switch 34a may also be lower.

The coupled inductor 36a may be tightly coupled together preferably having a coefficient of coupling, K, of approximately one, where unity is the ideal value. Preferably the inductors of the coupled inductor 36a are wound together on a common magnetic core to form an inductor assembly that provides the maximum value of coefficient of coupling. The coefficient of coupling is approximately one being at least 0.9 and preferably greater than 0.99. The polarity for each of the windings for the coupled inductor 36a are selected so that the current flowing through each of the inductors of the coupled inductor 36a flows in the same direction. Any type of suitable core material may be used for the coupled inductor 36a including high permeability core materials such as ferrites having shapes such as bead and toroid, and lower permeability materials such as MPP cores, ferrite PQ cores, and other split core shapes.

Figure 2D:
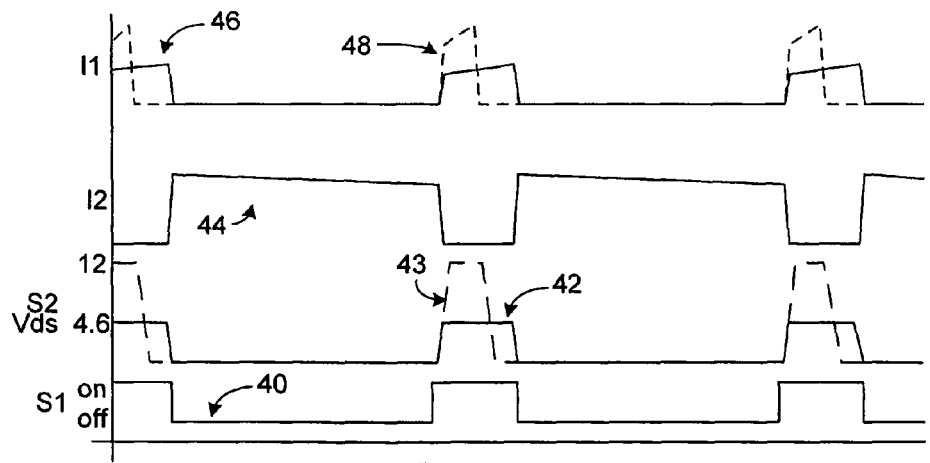
FIG. 2D is a representation of waveforms associated with an aspect of a voltage regulator.

FIG. 2D shows waveforms associated with an aspect of the voltage regulator 30 with Vin equal to 12 volts and Vout equal to 1.2 volts. Waveform 40 shows the conduction state of the conduction switch, S1, 32a. Waveform 42 shows the drain-source voltage, Vds, of the freewheeling switch 34a. The amplitude of Vds during the on-time of the conduction switch 32a is approximately 4.67 volts. Waveform 43 shows Vds of the freewheeling switch for a standard topology buck converter. The Vds for the standard topology buck converter is approximately equal to the input voltage of 12 volts. Waveform 44 shows the current flowing through the freewheeling switch 34a. Waveform 46 shows the current flowing through the conduction switch 32a, and waveform 48 shows the current for a standard topology buck converter conduction switch. Waveforms 46 and 48 show that for a turns ratio of 2, the current flowing in a conduction switch is approximately two times greater than the current flowing the conduction switch 32a of the voltage regulator 30. As shown, the standard topology buck converter may have significantly greater switching losses due to the higher drain-source voltage and current. In addition, the risetime and falltime of the drain-source voltage in the standard topology buck converter may comprise a significantly greater proportion of the pulse-width resulting in leading to greater switching losses. By employing the coupled inductor 36a with a turns ratio of at least approximately two, the switching losses and voltage stress of the freewheeling switch 34a may be decreased. In addition, the current ripple flowing to the output capacitor 38a is approximately decreased in proportion to the turns ratio. For example, with a turns ratio of two, the current ripple is approximately decreased by a factor of two, thereby permitting the use of a lower value output capacitor to attain a similar output voltage ripple.

FIG. 3A shows an aspect of a coupled inductor 50 wound on a toroid. The windings of the coupled inductor 50 are arranged so that currents flow through the windings in the same direction.

FIG. 3B shows another aspect of a coupled inductor 52 wound on a planar assembly. The coupled inductor 52 is similar in function to the coupled inductor 50 such as the windings are arranged so that currents flow through the windings in the same direction. Any form of coupled inductor may be employed such as the coupled inductors shown and described in U.S. non-provisional application Ser. No. 10/621,128, filed Jul. 16, 2003 and Ser. No. 10/744,416, filed Dec. 22, 2003 which are hereby incorporated by reference in their entirety.

FIG. 4 shows an aspect of a voltage regulator 100 having multiple output phases. The voltage regulator 100 includes from 2 to N voltage regulators 30 connected in parallel. Each of the voltage regulators 30 may operate in accordance with the principles described above. In one aspect, an output capacitor 38a may filter the combined output of the voltage regulators 30. In another aspect, an output capacitor 38b may be included in each of the voltage regulators 30. In another aspect, a combination of output capacitors 38a and 38b may be included to provide output filtering. A phase generator 102 may generate pulse signals to control the phase relationship between each of the voltage regulators 30 so that the outputs of the voltage regulators are time skewed by a predetermined time leading to higher frequency output ripple. Each of the voltage regulators 30 advantageously provides of two conventional voltage regulators operated in multi-phase configuration since each of the voltage regulators 30 may stretch out the duty cycle by a factor of two when the turns ratio is set to two.

A number of embodiments of the invention have been described. Nevertheless, it will be understood that various modifications may be made without departing from the spirit and scope of the invention. Accordingly, other embodiments are within the scope of the following claims.

What is claimed is:

1. A voltage regulator for generating an output voltage from an input voltage, comprising:
   at least one coupled inductor including a first winding and a second winding each having a polarity, the first winding and the second winding connected in series to form a common node and such that the first winding and the second winding have the same polarity, the first winding and the second winding having a coefficient of coupling greater than or equal to 0.99;
   a conduction switch having an on-state and an off-state, to controllably conduct the input voltage to the at least one coupled inductor at a switching frequency; and
   a freewheeling switch having an on-state and an off-state, in communication with the common node of the at least one coupled inductor to provide a path for current when the conduction switch is in the off-state,
   wherein the first winding has a number of turns N1, the second winding has a number of turns N2 and a turns ratio N1/N2 is at least two.

2. The voltage regulator of claim 1 wherein the turns ration is approximately two.

3. The voltage regulator of claim 1 wherein the coupled inductor is formed on a single core of magnetic material.

4. The voltage regulator of claim 1 further comprising an output capacitor in communication with the at least one coupled inductor to filter the output voltage.

5. The voltage regulator of claim 1 wherein the conduction switch includes parallel independently controlled switches.

6. The voltage regulator of claim 1 further comprising a multi-level gate drive to control the conduction switch.

7. The voltage regulator of claim 1 wherein the freewheeling switch is selected from a group consisting of uni-directional switches, bi-directional switches, diodes, rectifiers, synchronous rectifiers, FETs, NMOS, PMOS, BJTs, and IGBTs.

8. The voltage regulator of claim 1 further comprising at least another voltage regulator connected in parallel with the voltage regulator.

9. A voltage regulator for generating an output voltage from an input voltage, comprising:
   at least one coupled inductor including a first winding and a second winding each having a polarity, the first winding and the second winding connected in series to form a common node and such that the first winding and the second winding have the same polarity, the first winding and the second winding having a coefficient of coupling greater than or equal to 0.99;
   means for conduction switching having an on-state and an off-state, to controllably conduct the input voltage to the at least one coupled inductor at a switching frequency; and
   means for freewheeling switching having an on-state and an off-state, in communication with the common node of the at least one coupled inductor to provide a path for current when the conduction switching means is in the off-state,
   wherein the first winding has a number of turns N1, the second winding has a number of turns N2 and a turns ratio N1/N2 is at least two.

10. The voltage regulator of claim 1 further comprising a controller to control the on-time of the conduction switch such that the output voltage is regulated to a predetermined amplitude.

11. The voltage regulator of claim 1 wherein the freewheeling switch has a lower withstanding voltage than the conduction switch.

12. The voltage regulator of claim 1 wherein the freewheeling switch and the conduction switch are Field Effect Transistors and the freewheeling switch has a lower Rds(on) than the conduction switch.

13. The voltage regulator of claim 9 further comprising at least another voltage regulator connected in parallel with the voltage regulator.

14. The voltage regulator of claim 9 wherein the turns ration is approximately two.

15. The voltage regulator of claim 9 wherein the coupled inductor is formed on a single core of magnetic material.

16. The voltage regulator of claim 9 further comprising means for filtering in communication with the at least one coupled inductor to filter the output voltage.

17. The voltage regulator of claim 9 wherein the conduction switching means includes parallel independently controlled switches.

18. The voltage regulator of claim 9 further comprising a multi-level gate drive to control the conduction switching means.

19. The voltage regulator of claim 9 wherein the freewheeling switching means is selected from a group consisting of uni-directional switches, bi-directional switches, diodes, rectifiers, synchronous rectifiers, FETs, NMOS, PMOS, BJTs, and IGBTs.

20. The voltage regulator of claim 1 wherein the conduction switch is selected from a group consisting of Field Effect Transistors (FETs), NMOS, PMOS, Bipolar Junction Transistors (BJTs), and Integrated Gate Bipolar Junction Transistors (IGBTs).

21. The voltage regulator of claim 8 further comprising a phase generator in communication with each of the voltage regulators to control a phase sequence of the voltage regulators.

22. The voltage regulator of claim 9 wherein the means for conduction switching is selected from a group consisting of Field Effect Transistors (FETs), NMOS, PMOS, Bipolar Junction Transistors (BJTs), and Integrated Gate Bipolar Junction Transistors (IGBTs).

23. The voltage regulator of claim 13 further comprising means for phase controlling in communication with each of the voltage regulators to control a phase sequence of the voltage regulators.

24. The voltage regulator of claim 9 wherein the means for freewheeling switching has a lower withstanding voltage than the means for conduction switching.

25. The voltage regulator of claim 9 wherein the means for freewheeling switching and the means for conduction switching are Field Effect Transistors and the means for freewheeling switching has a lower Rds(on) than the means for conduction switching.

* * * * *